Oct. 25, 1949.    M. K. GOLDSTEIN    2,485,585
DIRECTION FINDER
Filed June 13, 1945    2 Sheets-Sheet 1
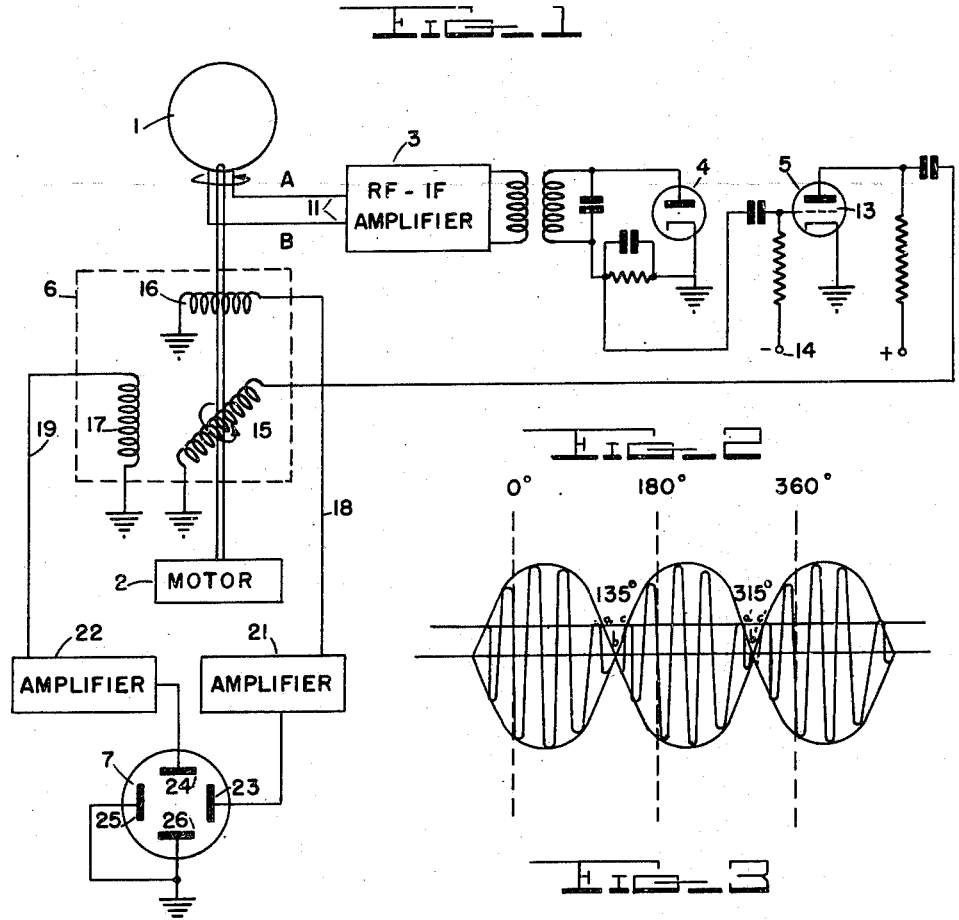
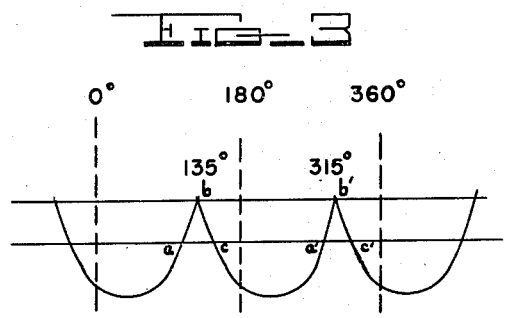
Inventor
MAXWELL K. GOLDSTEIN
By Ralph L Chappell
Attorney Oct. 25, 1949.　　M. K. GOLDSTEIN　　2,485,585
DIRECTION FINDER
Filed June 13, 1945　　2 Sheets-Sheet 2
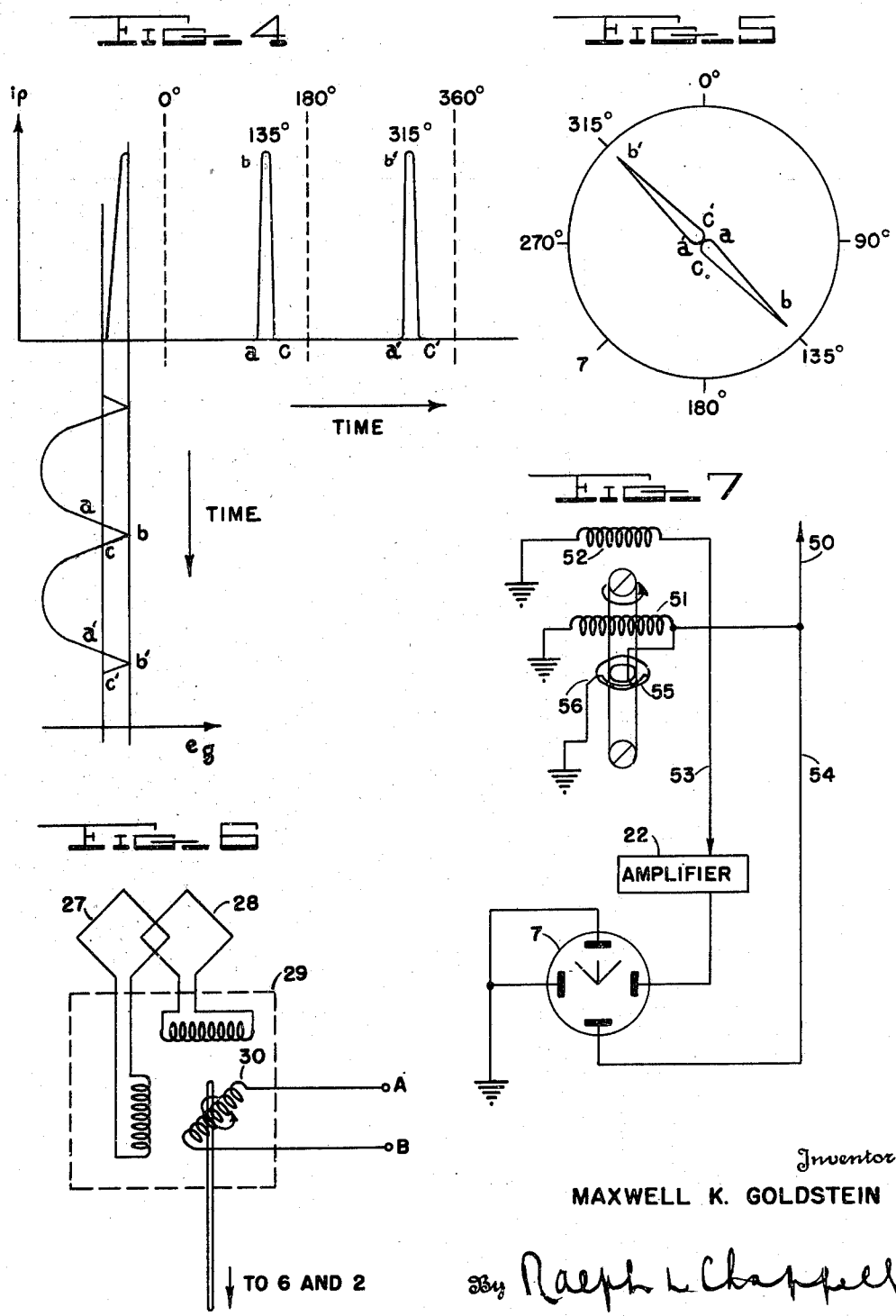
Inventor
MAXWELL K. GOLDSTEIN Patented Oct. 25, 1949

2,485,585

UNITED STATES PATENT OFFICE 2,485,585

DIRECTION FINDER

Maxwell K. Goldstein, Washington, D. C.

Application June 13, 1945, Serial No. 599,286

2 Claims. (Cl. 343—118)

(Granted under the act of March 3, 1883, as amended April 30, 1928; 370 O. G. 757)

This invention relates to direction finders, and is particularly directed to recurrently searching systems which give automatic indication of the direction of a received transmission.

Such direction finding systems normally include a directional antenna whose directional pattern is recurrently swept over the azimuth angle to the monitor. The output of the antenna system is fed to the receiver which provides an output signal when a singular directional characteristic of the antenna system is swept across the incoming transmission. The receiver output signal is applied to some indicating means which conventionally includes a mechanical element operated in synchronism with the directional antenna control.

Such systems demand synchronized mechanical movement of the antenna control means and of the above mentioned mechanical element of the indicating means. Consequently, such systems are not adaptable to remote or plural indication.

It is accordingly an object of the present invention to provide a direction finding system which supplies an output inherently carrying information with respect to the direction of an incoming signal which may be applied remotely to a self-contained indicator or indicators.

It is another object of the invention to provide a direction finder giving an output which may be directly applied to a cathode ray tube indicator or indicators to give an indication of the direction of a received transmission.

It is another object of the invention to provide a direction finder giving an instantaneous indication of the direction of a received transmission without any manual adjustment by the operator except to tune the receiver to the desired frequency.

The invention will be further described with reference to the exemplary embodiments shown in the drawings, in which:

Figure 1 shows schematically an embodiment of the invention,

Figures 2 through 4 show waveforms of various voltages and currents which are present during the operation of the system of Figure 1, Figure 5 shows the type of indication obtained by means of a cathode ray tube operated by the system of Figure 1, Figure 6 shows an alternative antenna component which may be employed in the system of Figure 1, and Figure 7 shows an additional embodiment of the invention.

The embodiment of the invention shown in Figure 1 includes a directional antenna 1. The spatial orientation of the directional sensitivity pattern of antenna 1 is continuously rotated by a driving motor 2. In this embodiment antenna 1 comprises a loop which itself is physically driven by the motor.

The output of the antenna is fed to a receiver unit comprising a radio and intermediate frequency amplifier 3 which drives a diode demodulator stage 4 which excites amplifier 5. The amplifier output is fed to a variable coupling unit 6 which is controlled synchronously with the directional sensitivity pattern of antenna 1. The output of the variable coupling unit inherently carries information as to the direction of the received transmission which may be directly applied to a suitable indicator. In the embodiment of Figure 1 this is shown as a cathode ray tube 7.

As will be understood the output of loop antenna 1 is communicated through leads 11 to the receiver unit. The loop output under a continuous wave transmission is such as is shown in Figure 2, the output falling to zero as the wave impinges broadside on the antenna. In the waveform shown in Figure 2, the received transmission is being propagated from a direction of 135° or 315°.

In the system of Figure 1, zero sensitivity of the antenna is employed as the singular directional characteristic from which the receiver output signal is derived. As shown in Figure 1, a negative output is obtained from demodulated stage 4 having a wave form substantially as shown in Figure 3.

This output voltage is applied to an amplifier 5, which in this embodiment constitutes an over-biased amplifier in which control element 13 is returned to a source of negative potential 14. The operation of the non-linear amplifier is apparent from Figure 4. The grid potential is below plate current cutoff except on the positive peaks of the grid signal which are produced in synchronism with alignment of the antenna system null and the direction of the received transmission. On the grid signal peaks the amplifier stage is driven substantially to saturation to provide the plate current pulses shown in Figure 4.

In Figures 2, 3, and 4, $a$, $b$, and $c$ and $a'$, $b'$, and $c'$ have been used to indicate corresponding points in time. In order to obtain an output from the direction finder embodying information as to the direction of the received transmission, the receiver output signal is applied to a variable coupling unit having a pair of output channels. The transmission characteristic of the coupling unit from the input channel to each output channel is varied synchronously with the variation in spatial orientation of the antenna directional sensitivity pattern. The output channel signals are then directly applied to indicating means which is differentially responsive to the relative signals in the two output channels. In the embodiment shown in Figure 1 the output signals are varied relatively with respect to both amplitude and sign. The variable coupler 6 shown in Figure 1 employs magnetic induction. For this purpose, the receiver output pulse is applied to a rotatable coil 15 which is driven synchronously with the antenna loop 1 by driving motor 2. Fixed coils 16 and 17 are also provided, and are mounted in the relationship shown in Figure 1. The voltages induced in coils 16 and 17 vary in magnitude and sign in dependency on the instantaneous position of rotatable coil 15 at the moment of impulse generation. Coil 16 feeds output channel 18 and coil 17 feeds output channel 19. The output channel signals, if necessary, may be passed through amplifiers 21 and 22 respectively.

The ratio of the output channel signals with respect to amplitude and sign uniquely characterizes the orientation of the directional sensitivity pattern of the antenna system at the time of delivery of the output impulse from the receiver unit. These signals may be delivered remotely to any desired number of indicators, only one of which is shown in Figure 1. The indicating unit is characterized in being differentially responsive to the ratio of the output signals with respect to their amplitude and sign, and in the embodiment shown in Figure 1 gives a unique indication for each ratio therebetween.

The indicator employed in the system of Figure 1 is, as mentioned above, a cathode ray tube. The tube shown is voltage operated, and for this purpose electrostatic deflection plates 23, 24, 25 and 26 are shown. Output channel 18 is fed to deflection plate 23, and output channel 19 is applied to deflection plate 24. The other deflection plates, 25 and 26, are grounded.

Under the application of an impulse current, which may be of the waveform shown at b and b' in Figure 4, to rotatable coil 15, voltages are simultaneously induced in fixed coils 16 and 17. The signal that will be induced in fixed coil 16 by an output impulse in coil 15 depends on the relative positions of the two coils, and may increase from zero to a maximum positive value during the first quadrant of movement of coil 15, progressively decrease from the maximum positive value to zero during the second quadrant, then increase negatively from zero to a maximum negative value in the third quadrant and progressively approach zero from this negative value during the fourth quadrant. During this sequence, the voltage that will be induced in coil 17 may progressively decrease from a maximum positive value to zero during the first quadrant, increase negatively from zero to a maximum negative value during the second quadrant, decrease from this value toward zero during the third quadrant and during the fourth quadrant will increase from zero to the maximum positive value. It is therefore apparent that the ratio of the output voltages in channels 18 and 19 are uniquely determined by the orientation of rotatable coil 15 at the moment of impulse output from the receiver unit. The application of the output signals from channels 18 and 19 to the cathode ray tube results in a type indication shown in Figure 5. Figure 5 specifically illustrates the indication of the cathode ray tube under application of the output impulse from the receiver such as is shown in Figure 4.

It will be understood that the principle of the invention embodied in Figure 1 may be effectuated in a variety of other systems. For instance, the directional characteristics of the antenna system shown in Figure 1 are varied by physically controlling the orientation of the antenna itself. Whereas this desirable in that it permits the use of a small tuned loop directly feeding the receiver, an arrangement such as shown in Figure 6 is fully equivalent. The latter includes crossed loops 27 and 28 feeding a goniometer 29 which has a rotatable coil 30 driven by a motor 2. The operation of this system is entirely similar to that of loop 1 as driven by motor 2 in Figure 1.

The variable coupling unit 6 shown in Figure 1 which employs induction is particularly suitable to the employment of the cathode ray type of indicator, inasmuch as the indication obtained is linear with respect to azimuth shown. Other types of coupling however, may be employed.

Figure 7 shows a further type of inductive variable coupling unit, which differs from that of Figure 1 characteristically in feeding the input channel signal directly to one of the output channels, and in the other channel supplying a signal of varying ratio thereto. In the embodiment shown in Figure 7 the receiver output is fed through input channel 50 to a rotatable coil 51 which is operated by motor 2 in synchronism with loop 1. A single stationary coil 52 is supplied which feeds output channel 53. The other output channel, 54, is fed directly from the input channel 50, as shown in the drawing. The input of rotatable coil 51 from the receiver output channel is controlled so as to supply output channel voltages only during one half revolution of the antenna system. For this purpose, a semi-circular contact 55 is synchronously driven with coil 51 and the antenna control system and is connected with the input channel 50. Contact 55 is grounded during half the revolution of the system by brush 56, the brush being positioned to be swept by the midpoint of the contact synchronously with zero coupling of the coils 51 and 52. During the operative half cycle of the rotating system, an output impulse from the receiving unit will supply in output channel 54 an impulse of constant magnitude. At cathode ray indicator 7, as shown in Figure 7, this produces an upward deflection of the beam of constant magnitude. This is accompanied by an output signal in output channel 53 having an amplitude and sign progressively varying during the operative half cycle from a maximum negative value through zero to a maximum positive value. The resulting indication is uniquely determined by the ratio of the output signals and will vary as shown, where the output signals are of equal maximum amplitude, over an arc of 90°.

It will be understood that the embodiments shown and described are exemplary only, and that the scope of the invention will be determined with reference to the appended claims.

The invention described herein may be manufactured and used by or for the Government of the United States of America for governmental purposes without payment of any royalties thereon or therefor.

What is claimed is:

1. In a radio direction finder, a receiver, a directional antenna system for receiving radio signals whose direction is to be determined, said antenna system feeding said receiver, means for cyclically varying the effective directional characteristics of the antenna system whereby the output of said receiver is cyclically varied in amplitude, means including an overbiased amplifier fed by said receiver operative to deliver a momentary output impulse in response to each signal minima in the cyclically varied received signal, a variable coupler including an input element fed by the pulse output from said amplifier and a pair of output elements, means cyclically varying the degree of coupling between said input element and said output elements in synchronism with the cyclical variation in the directional characteristics of said antenna system, and an indicating means operative responsive to the output signals from said output elements to indicate the direction of the incoming signals.

2. In a radio direction finder, a receiver, a directional antenna system for receiving radio signals whose direction is to be determined, said antenna system feeding said receiver, means for cyclically varying the effective directional characteristics of the antenna system whereby the output of said receiver is cyclically varied in amplitude, means including an overbiased amplifier fed by said receiver operative to deliver a momentary output impulse in response to each signal minima in the cyclically varied received signal, a variable coupling means including an input coil fed by the output of said amplifier and an output coil positioned in differing coupling relationship to said input coil, said input coil being rotatable relative to said output coil whereby the signal output from said output coil is governed in sign and amplitude by the angular position of said input coil, means synchronously varying the directional characteristics of said antenna system and the angular position of said input coil, and a cathode ray tube indicator including horizontal and vertical beam deflecting means, and means feeding the output signals from said output coil and said amplifier respectively to the horizontal and vertical deflecting means to indicate direction of the incoming signal.

MAXWELL K. GOLDSTEIN.

REFERENCES CITED

The following references are of record in the file of this patent:

UNITED STATES PATENTS

| Number | Name | Date |
| --- | --- | --- |
| 2,400,791 | Tolson | May 21, 1946 |
| 2,403,967 | Busignies | July 16, 1946 |
| 2,407,281 | Johnson et al. | Sept. 10, 1946 |

FOREIGN PATENTS

| Number | Country | Date |
| --- | --- | --- |
| 635,793 | Germany | Sept. 28, 1936 |
| 862,466 | France | Dec. 9, 1940 |